C. A. McEvoy.
Station Indicator.

No. 800. Reissued Aug. 23, 1859.

N. PETERS, PHOTO-LITHOGRAPHER, WASHINGTON, D. C.

UNITED STATES PATENT OFFICE.

C. A. McEVOY, OF RICHMOND, VIRGINIA.

IMPROVEMENT IN RAILROAD STATION-INDICATORS.

Specification forming part of Letters Patent No. 13,824, dated November 20, 1855; Reissue No. 800, dated August 23, 1859.

*To all whom it may concern:*

Be it known that I, CHARLES A. McEVOY, of Richmond, in the county of Henrico, in the State of Virginia, have invented a new and useful machine, which I denominate the "Station Annunciator for Railroad-Cars;" and I do hereby declare that the following is a full and exact description thereof, reference being had to the accompanying drawings, and to the letters of reference marked thereon.

Figure 1:
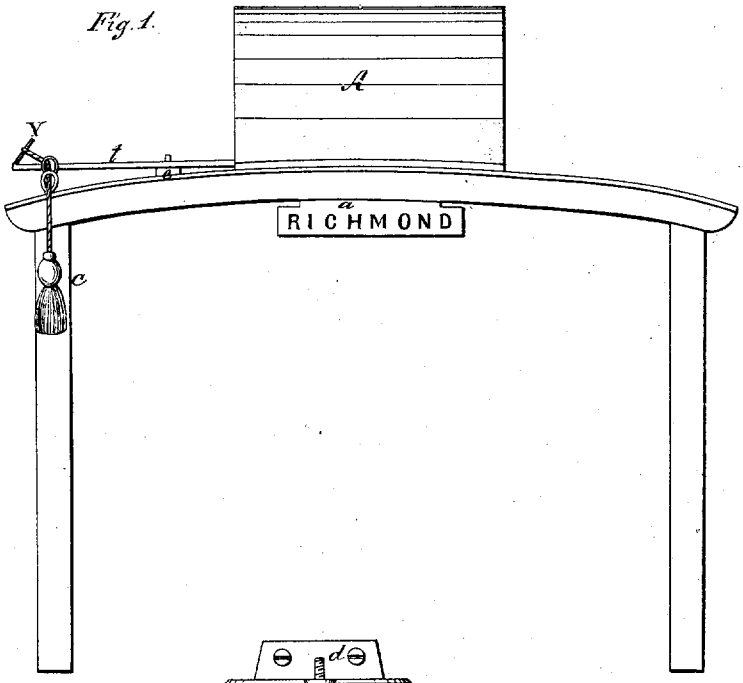
Figure 3:
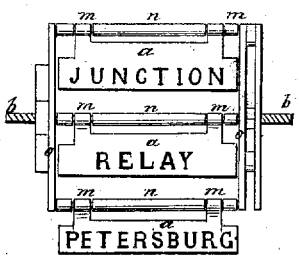
Figure 5:
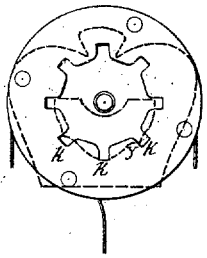
Figure 2:
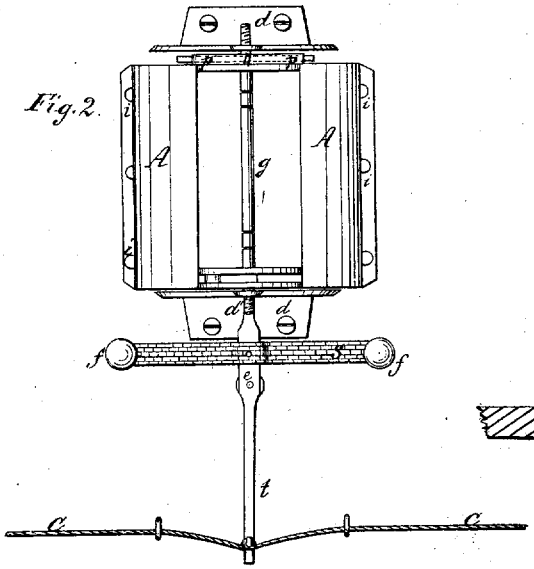
Figure 4:
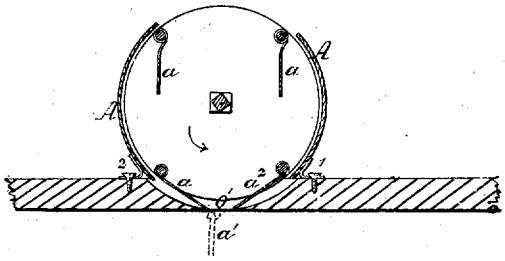
Figure 6:
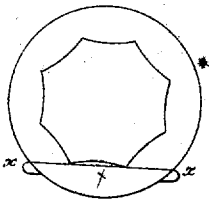

Figure 1 represents the end view of the car-body with the apparatus attached and covered with its casing. Fig. 2 is a top view with the outer casing removed, the yielding, the partial inside inclosure, A A, being secured to the top of the car by screws *i i*. This casing is merely a thin metallic sheathing, and is intended to compel the hinged signs or symbols to keep in their proper rotative position as they pass around, as hereinafter explained. Fig. 3 shows the casing removed, with the signs *a a a* hanging, being hinged at *m m m*, on bars distending two circular disks, *o o*, which revolve in bearings on an axle at *b b*; Fig. 4, a cross-section showing four signs to the opening *o'*, where they drop into visible position by their own weight, as at *a'*. It may be here observed that from this latter position at *a'* the signs (as the signs are moved a proper distance intermittently) are drawn up, as at $a^2$, and forced to return. Fig. 5 is an end view showing the projections or teeth *k k*, which serve, in combination with the trigger-lever *t*, to turn the disks just the proper distance at each movement of the lever *t* to let down or take up a sign. Fig. 6 represents polygonal disks on the reel, serving, in conjunction with the spring *x x*, to bring into and to retain in proper position the signs as they are brought into and taken out of sight by the revolution of the reel.

With the foregoing explanations and drawings but a short general description need precede the claim to a machine so simple.

My invention is designed to enable the conductor (or automatically, as hereinafter shown) to cause any convenient symbol or device—I have herein used lettered signs—to appear to the passengers inside the car indicating the place, time of stoppage, distance, &c. I have adopted a rotary mechanism, but its equivalent may clearly be effected by curved or rectilinear apparatus. The machine may be placed at any part of the car. I prefer the top, middle, and center, and, if possible, would claim that position. I construct a reel—that is, I place two disks at proper distances apart to admit the length of sign required, and connect these by any number of round rods of metal parallel to the axle or central rod passing through the centers, (see Fig. 3, *m m m*,) and to each of them a sign is hinged to move by its own weight, (or by springs, &c., if preferred.) This reel is hung in bearing at 4 4 in Fig. 2, made fast to the top of the car at *d d*. This reel is caused to move so as to bring a sign into view and to remove it at its next move in the following manner: A lever, *t*, pivoted at *e*, Fig. 2, may move by means of a cord, *c*, to right and left. It is brought back by an ordinary spring, *s*, to its normal position, as in the drawing. The inner arm of the lever *d'* strikes against one of the projections *k*, Fig. 5, as it is drawn by cords *c*, and turning the reel one move, which is regulated by the projection *y*, Fig. 5, throwing the lever out of connection with projection *k*, Fig. 5, and thus brings into sight through the aperture at *o'*, Fig. 4, the sign, as at *a*, Fig. 1. The reel is retained in position while the lever slides back to its normal position by a spring, *p*, Fig. 2, operating upon one face of the polygonal disk, as seen at Fig. 6, *x x*. Thus one jerk of the cord presents a sign to the passengers, and the next similar jerk withdraws that sign and leaves the aperture ready for the admission of another sign in order at next jerk of cord.

It is evident that the lever *t* may at *v*, Fig. 1, be struck by stops properly arranged on the road, and thus obviate the cord, rendering the machine automatic and entirely independent of the conductor.

Disclaiming the use of an indicator pointing to fixed signs, and also movable signs, where but one side is visible, I claim as new and of my own invention—

Presenting a movable sign or symbol to passengers of a railroad-car so that both sides of said sign shall be visible and utilized as annunciators, by passing each sign in turn through an opening of the case by the revolving of the drum to which the said signs are attached.

In testimony whereof I have hereunto subscribed my name before two subscribing witnesses.

Witnesses: C. A. McEVOY.

GEO. PATTEN,

JOHN S. HOLLINGSHEAD.